United States Patent [19]

Lockwood, Jr.

[11] Patent Number: 4,911,403
[45] Date of Patent: Mar. 27, 1990

[54] PRESSURE RESPONSIVE TWO-WAY SHUT-OFF VALVE

[75] Inventor: Hanford N. Lockwood, Jr., San Mateo, Calif.

[73] Assignee: NEA Technologies, Brisbane, Calif.

[21] Appl. No.: 370,219

[22] Filed: Jun. 22, 1989

[51] Int. Cl.⁴ ............................................. F16K 15/18
[52] U.S. Cl. .................................. 251/83; 137/516.29; 141/21; 222/3; 251/121; 251/210; 251/297
[58] Field of Search ...................... 137/516.29; 141/18, 141/21; 222/3; 251/82, 83, 120, 121, 122, 210, 297

[56] References Cited

U.S. PATENT DOCUMENTS

| | | | |
|---|---|---|---|
| 2,225,586 | 12/1940 | Dillman | 251/83 |
| 2,547,853 | 4/1951 | Butterfield | 251/83 |
| 2,733,729 | 2/1956 | Wolfe | 251/297 |
| 2,929,401 | 3/1960 | Cowan | 137/516.29 |
| 3,072,135 | 1/1963 | Moskow | 251/297 |
| 3,292,895 | 12/1966 | Leger et al. | 251/83 |
| 3,981,328 | 9/1976 | Yonezawa | 251/83 |
| 4,211,386 | 7/1980 | Yocum et al. | 251/122 |
| 4,402,340 | 9/1983 | Lockwood, Jr. | 251/335.2 |

Primary Examiner—George L. Walton
Attorney, Agent, or Firm—Townsend and Townsend

[57] ABSTRACT

A shut-off valve for use with high pressure gas cylinders is disclosed which is adapted to automatically retain a residual pressure in the cylinder. The valve includes a check plug axially moveable within the housing which has a hard sealing surface, for establishing high pressure seals and a soft sealing surface for establishing low pressure seals. The plug is spring-biased into the closed position with force selected so that it automatically closes and seals the interior of the cylinder once the gas pressure in the cylinder drops to or below a predetermined threshold pressure. The plug, in combination with the valve seat, forms pressure drop zones upstream and downstream of the sealing surfaces which reduce the pressure and gas flow velocities past the sealing surfaces during the initial phases of the opening and the final phases of the closing of the valve sufficiently to prevent high pressure and/or high gas flow velocities from damaging or destroying the sealing surfaces irrespective of the gas flow direction through the valve. The valve includes an actuating mechanism for manually opening and closing the valve against high pressure by appropriately turning a handwheel. A tamper proof opening key is provided which cooperates with the opening mechanism in the vicinity of the handwheel so that the check valve can be opened manually for recharging the cylinder with high pressure gas.

38 Claims, 4 Drawing Sheets

PRESSURE RESPONSIVE TWO-WAY SHUT-OFF VALVE

BACKGROUND OF THE INVENTION

1. Field of the Invention

The present invention relates generally to shutoff valves, and, more particularly, it relates to a shut-off valve which automatically blocks flow from a gas cylinder when the pressure in the cylinder falls below a predetermined level.

2. Brief Description of the Relevant Art

When the pressure in a gas cylinder is depleted, the cylinder must be refilled. It is desirable to leave a small residual pressure in the cylinder to prevent its contamination before it is refilled by the gas supplier. Gas cylinders are typically provided with a manual shut-off valve at their outlet, so that when the pressure in the gas cylinder falls below the minimum acceptable level, the user can close the hand valve to prevent a loss of the residual pressure.

Often, however, the manual shut-off valve on such cylinders is left open by the user and the residual gas pressure is lost. The cylinder must then be cleaned and purged prior to refilling in order to meet the required purity specifications for the particular gas. The cleaning of the cylinder is an extra step which increases the cost of the refilling.

It is thus desirable to provide an automatic shut-off means which will seal the outlet of the cylinder whenever the pressure therein falls below a predetermined level. Heretofore, this has been accomplished by providing a check valve which is typically located in the outlet port of the manual shut-off valve. Such check valves are disclosed in U.S. Pat. No. 3,384,133 to Gordon and U.S. Pat. No. 4,210,168 to Yonezawa.

However, the use of a check valve separate from the mechanism of the manual shut-off valve is undesirable for a number of reasons. First, it increases the complexity and cost of the valve. Second, it can be tampered with or removed by the user in an attempt to bypass the check valve. Further, an additional port is sometimes formed in the valve body where the user might attempt to remove the check mechanism while it is under pressure which can result in serious injuries. Additionally, in the gas cylinder industry, shut-off valves for gas cylinders must be made small enough to fit beneath protective covers of a standard size. The provision of a second valve mechanism within the shut-off valve body makes it more difficult to achieve a small enough valve size so that it fits inside a standard cover.

Nevertheless, the inclusion of a separate check valve is necessary because of the broad pressure range over which the cylinder operates. The manual valve must be capable of sealing against cylinder pressures which can be in excess of 3,000 PSIG, while the automatic shut-off of the cylinder should occur when the internal pressure is in the range from approximately 10 to 50 PSIG.

The combination of a valve plug and seat capable of forming a seal against very high pressures which is also suitable for automatic actuation by a spring set to seal against low pressures is disclosed in U.S. Pat. No. 4,402,340 to Lockwood. This patent discloses that a valve plug having a hard seal required for high pressure operation can be combined with a soft seal capable of establishing a low pressure seal in a manner which prevents the deformation and possible failure of the latter when subjected to high pressure. Thus, the Lockwood patent discloses a compact, automatically acting gas cylinder shutoff/check valve which will prevent low pressure leakage on cylinders even if they are stored for long periods of time prior to refilling.

The valves disclosed in the Lockwood and Yonezawa patents have been extensively tested. They both can be manually closed and they will hold high pressure. They also are designed so that they will automatically close and hold and maintain a residual pressure in the cylinder for an extended period of time.

They further require a mechanical system to hold the check valve in its open position prior to pressurizing the refilling manifold. Such a mechanical system differs from the standard Compressed Gas Association (CGA) connectors used in the industry. Thus, cylinders equipped with a valve disclosed in the Lockwood or Yonezawa patents require special handling while the special mechanical check valve opening adapters are installed.

Testing also indicates that if the check valves disclosed in the patents are pressurized at the valve outlet, thereby creating a large pressure differential with the valve inlet prior to the opening of the check valve (as might occur during cylinder refilling), the low pressure, soft seal can become dislodged, resulting in a failure of the check valve. The valves disclosed in these patents are therefore limited to a unidirectional high pressure differential from the valve inlet to the valve outlet.

Thus, it would be desirable to have a gas cylinder shut-off valve which includes a check valve and can be used with standard CGA connectors. It is, however, mandatory to provide such a valve with hard and soft sealing surfaces which can be operated irrespective of the direction of the high pressure differential without damaging either the hard or soft seal. Such a valve is not found in the prior art.

Valves having a single valve plug and seat and dual actuating means are found in other applications, however. U.S. Pat. No. 3,211,175 to Replogle discloses a combination regulating and check valve. An automatic actuator can be adjusted to provide the desired outlet pressure from the gas cylinder. An integral check valve is provided to allow the gas cylinder to be filled without having to remove the gas regulator from the cylinder. The disclosed valve is provided in addition to a manual shut-off valve. Consequently, it need not be capable to shut off over a wide range of pressure.

Further, a combination metering, check and shut-off valve is disclosed in U.S. Pat. No. 3,420,493 to Kraft. The valve described therein is a conventional needle valve having a spring loaded valve plug. A threshold flow of fluid through the valve holds the plug fully open in relation to an adjustable valve stem. Flow below this threshold level allows the valve plug to spring closed regardless of the position of the valve stem. This valve is also incapable of sealing over a wide range of pressure.

Thus, while it is known to combine a hard and soft sealing material into a single valve plug to provide a manually actuated high pressure seal and an automatic actuated low pressure seal, they have not been designed to allow a high pressure differential across the plug in both directions of flow.

SUMMARY OF THE INVENTION

The present invention overcomes the above-discussed shortcomings of the prior art by providing a pressurized gas cylinder valve with a specially designed valve plug which seals tightly without being damaged against low inlet pressures when closed by a small force and against high pressures when closed by a much larger force irrespective of the direction of even the largest pressure differential encountered during operation. The valve of the present invention is a combined shut-off and check valve for use on pressurized gas cylinders which requires only a single valve plug and a single valve seat. The valve shuts off automatically when the pressure in the cylinder falls below a predetermined threshold level so that there is effectively no leakage even over extended time periods.

Generally speaking the valve of the present invention comprises a valve body having an inlet port, and outlet port, and a passageway therebetween. The inlet port is typically mounted on top of it and receives gas directly from the gas cylinder. In normal operation, the outlet port is connected to a regulating valve. A portion of the passageway defines a valve seat. A valve plug is reciprocally disposed in the valve body and can be manually, e.g., with a handle, urged against the seat. Additionally, a spring resiliently urges the valve plug against the valve seat whenever the pressure in the gas cylinder falls below the threshold level.

The plug and seat form two high pressure drop zones and the plug has at least two separate sealing surfaces located between the pressure drop zones. The first pressure drop zone separates the valve outlet from the two sealing surfaces while the second pressure drop zone is located between the two sealing surfaces and the valve inlet. The pressure drop zones restrict the fluid flow over area of the seat and especially over the soft seal in either direction while, and for a short time after the soft sealing surface becomes disengaged from the seat in the valve body. This prevents the soft seal from being damaged, extruded or dislodged from the valve plug. As the plug disengages from the seat, by either mechanical or automatic means, gas begins to leak past the two sealing surfaces. The up-stream pressure drop zone restricts the flow towards the seal and reduces the differential pressure acting on the seals. As the flow increases, the pressure drop zone down stream of the seals further restricts the gas flow. This causes a pressure buildup in the area of the seals which reduces the pressure differential between the flow source and the soft seal on the plug. The pressure drop zones are maintained as the soft seal clears the valve seat.

In the preferred embodiment of the invention, the pressure drop zones are formed so that they always define a flow area which is smaller than the flow area between the soft seal and the associated valve seat. As the plug is further withdrawn from the seat, the high pressure drop zones cease to be effective, allowing the gas flow through the valve to increase to its full design capacity. The pressure drop zones are located on both sides of the plug seals. Consequently, the valve can be opened manually or automatically against high gas pressure differentials between the outlet and inlet in either direction.

Between the two high pressure drop zones the plug includes at least two separate sealing surfaces. The first, soft sealing surface is chosen so that it will form a tight seal with a relatively low actuating force such as that provided by a spring. The spring force is selected so that it is sufficient to maintain a seal when a residual pressure of a predetermined magnitude, i.e., the "threshold pressure" is in the gas cylinder. The second, hard sealing surface seals tightly against the corresponding valve seat when high pressure is encountered by applying a relatively large force to the valve plug, typically with a handle or handwheel. The seal established by the second sealing surface can withstand the entire range of pressures to which the valve can be subjected. When the second sealing surface is engaged, the first sealing surface may be further deformed without being damaged or reaching its elastic limit.

The spring force acts directly against the plug so that it urges the plug against the seat. When the threshold pressure is reached, i.e., when the force of the spring exceeds the fluid pressure acting in the plug, the check valve closes. Because of this force balancing, it is necessary that the valve plug establishes a seal with a relatively small seating force. In a presently preferred embodiment the spring and valve plug are designed to establish a seal with the seating force of as little as approximately 1.5 to 3 pounds.

The present invention also makes it possible to refill the cylinder without the need to remove the combined shut-off and check valve. This is accomplished with a special opening key that can be threaded onto the handwheel when the valve is in its fully closed position. The key includes a projection adapted to urge an axially movable pin located in the upper stem of the valve down and against a spring cup which retains the upper end of the valve plug spring. The downward displacement of the spring cup moves two or more locking spheres or balls radially outward until they nest in a groove on the inside of the lower stem of the valve. This locks the valve plug to the lower stem, thereby enabling the operator to open the plug with the valve handwheel.

The plug opening system is completely contained in the stem cavity of the valve housing. Thus, it is virtually impossible to tamper with or bypass the check valve. Furthermore, the valve is constructed so that the opening key cannot be installed unless the valve is in its fully closed position to protect the internal components of the stem locking system.

With the opening key installed, the handwheel can be used to open and close the valve plug to allow refilling of the cylinder. Standard CGA fittings can be used and a cylinder using the new valve can be filled on the same manifold system as cylinders using conventional hand valves.

DETAILED DESCRIPTION OF THE DRAWINGS

DESCRIPTION OF THE PREFERRED EMBODIMENTS

Figure 1:
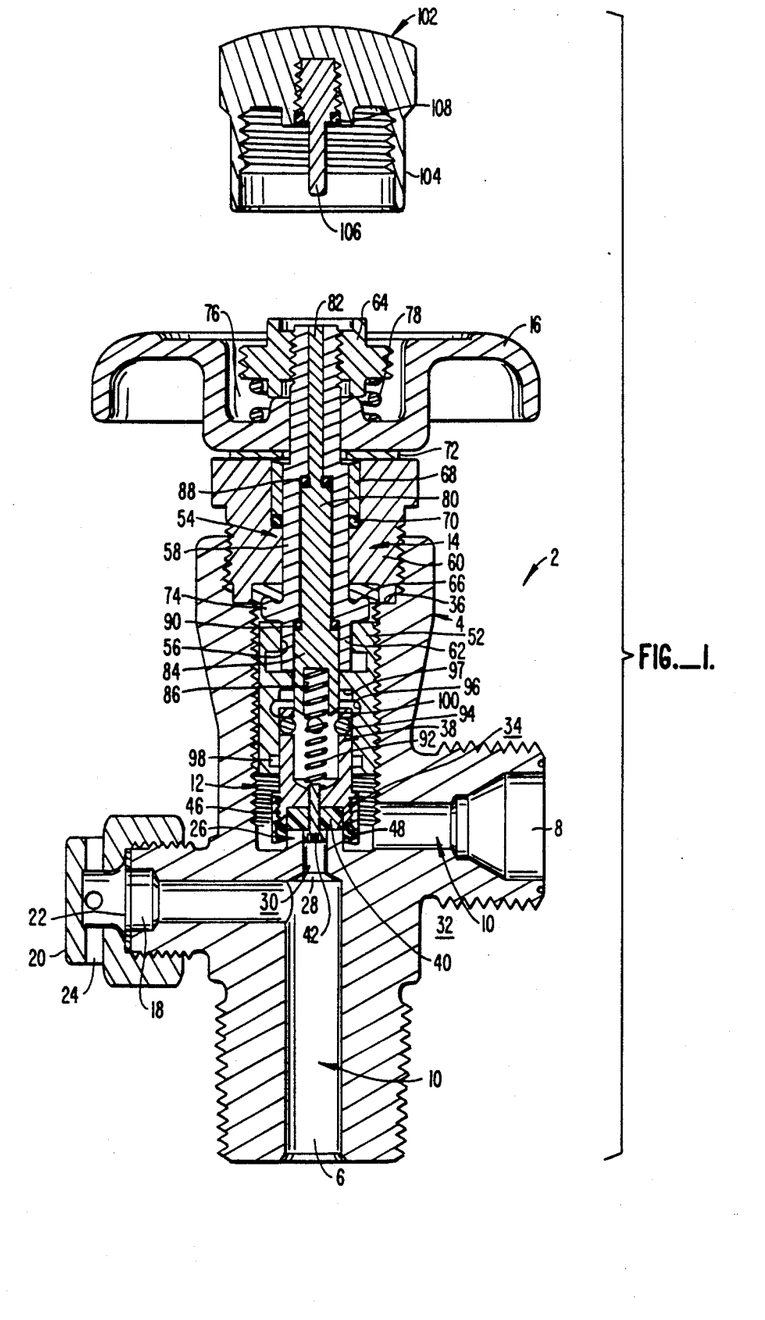
FIG. 1 is an elevational view, in section, of a first embodiment of the present invention.

Referring first to FIG. 1, a valve 2 constructed in accordance with the present invention comprises a body or housing 4 which has an inlet port 6, an outlet port 8, which is typically at a 90° angle from the inlet port, and a passage 10 which connects the two ports. The housing further includes an interior chamber 12 which is generally axially aligned with the inlet and which terminates at an access opening 14 at the end of the housing opposite the inlet port. The chamber houses an activating mechanism 54 for the valve and there is an actuator, such as a handwheel 16 exteriorly of the access opening, for operating it. Finally, the housing includes a safety pressure release port 18 in fluid communication with flow passage 10. It is ordinarily closed and sealed with a safety cap 20 housing a rupture disk 22. If excess, unsafe pressure prevails in the passage, the disk ruptures and pressurized fluid can escape via openings 24 in the cap.

The inlet and outlet ports carry appropriate threads so that the inlet port can be threaded into a corresponding threaded opening (not shown) in a gas cylinder and the outlet port can be coupled to standard, conventional gas fittings (not shown).

Turning to the construction of the housing, and referring to FIGS. 1-4, it includes an annular valve seat 26 in the form of an annular boss which surrounds a restricted portion 28 of the passage and defines inner and outer, concave and convex, respectively, surfaces 30, 32 and an end face 34. As will be more fully described below, the inner and outer cylindrical surfaces and the end face of valve seat 26 form sealing surfaces and fluid pressure drop zones which require tight tolerances. Hence, these surfaces have a smooth, e.g., machined finish.

Housing chamber 12 defines a hollow interior space of the valve body 4 between the valve seat and the access opening 14. The access opening is defined by a threaded, relatively large diameter bore which ends in a shoulder 36. The remainder of the chamber, from the shoulder to valve seat 26, is generally cylindrical and carries an internal thread. Further the horizontal portion of flow passage 10 which terminates in outlet port 8 communicates with the chamber at about the lower end thereof.

A valve plug 38 is reciprocally disposed in the lower portion of the chamber. It has a generally cylindrical configuration and, at its end facing valve seat 26, a cylindrical recess which holds a hard sealing disk 40 made of a material such as Nylon or Kel-F (trademarks). An Allenhead socket cap screw 42 secures the sealing disk into the recess of the plug. The head 44 of the screw has a cylindrical configuration and its diameter is closely controlled so that a gap is formed between the periphery of the head and the opposite, concave surface 30 which is in the range between about 0.001" and 0.015" end, preferably, between 0.001" and 0.010" for purposes more fully described below. This gap, which is generally more effective with the lower clearance, defines a first, upstream high pressure drop zone 49.

The lower end (as seen in FIG. 1) of plug 38 carries a tubular retaining ring 46 which is threaded onto the exterior of the plug. The lower plug end and the retaining ring form an inwardly opening gland which mounts an O-ring 48 made of a relatively soft and resilient material such as silicone fluorocarbon, buna N or neoprene. The free end of the retaining ring forms a generally radially inwardly extending end wall 50 which defines a cylindrical opening through which valve seat 26 extends when the plug is in its lowermost, closed position.

The opening defined by end wall 50 is dimensioned so that a gap is formed between it and the opposite, convex surface 32 which is in the range between about 0.001" to 0.015" and, preferably, between 0.001" and 0.010". The gap, which is generally more effective with the lower clearance, defines a second, downstream high pressure drop zone 51.

The end of the valve plug facing access opening 14 is movably disposed within an axial bore of a lower stem or sleeve 52 which threadably engages the female thread of housing chamber 12. The plug is both axially and rotationally movable in the bore of the lower stem. Further, the plug includes an axially oriented opening which extends from its upper end (facing the access opening) towards hard sealing disk 40 but which is separated therefrom by a transverse wall or bulkhead 53 into which screw 42 is screwed.

Still referring to FIGS. 1-4, valve plug 38 functions as follows. When the valve is closed to shut off any fluid, e.g., gas flow through the passage 10, the plug is in its lowermost position (shown in FIGS. 1 and 3) and sealing disk 40 is forcefully pressed against face 34 of valve seat 26 to establish a high pressure seal. The disk material is chosen so that it is not damaged when subjected to the maximum closing force. In this position of the plug, the relatively soft O-ring 48 sealingly engages the convex surface 32 of the valve seat, screw head 44 extends into the reduced diameter portion 28 of the flow passage, and the cylindrical opening in end wall 50 of the retaining ring 46 overlaps the valve seat. Consequently, the first and second pressure drop zones 49 and 51 are effective. Because of the narrowness of the gaps, the pressure prevailing at the sealing disk 40 and the O-ring 48 will be significantly less than the pressure prevailing at the inlet and/or outlet ports 6, 8.

To open the valve, plug 38 is moved from its closed position (shown in FIGS. 1 and 3) to its open position (shown in FIGS. 2 and 4) by appropriately turning handwheel 16. The construction and operation of the valve actuating mechanism 54 is described in detail below.

As the valve plug is raised, sealing disk 40 first disengages from its cooperating seating surface 34. Thereafter, the soft O-ring 48 leaves seating surface 32 to break the seal established by the valve.

Pressurized fluid can now flow from the inlet to the outlet or vice versa, depending on which is subjected to a higher pressure. It should be noted that the close, opposing relationships between the inner and outer surfaces 30, 32 of valve seat 26 and the screw head 44 and retaining ring end wall 50 remain until the plug has moved away from the valve seat a distance equal to the height of screw head 44 (as measured from the sealing disk 40). The retaining ring end wall 50 is formed so that its side facing towards the inlet port 6 has approximately the same spacing from the sealing disk as the free end of the screw head. Consequently, until the valve plug has been raised a distance about equal to the height of the screw head, the first and second pressure drop zones 49, 51, remain active. Thus, the pressure prevailing between the two pressure drop zones, i.e., at sealing disk 40 and O-ring 48, will be significantly less than the highest pressure on either side of the pressure drop zones. Hence, fluid flow rates past the sealing disc, and especially past the relatively soft, resilient and relatively easily dislodged O-ring 48 can be reduced to whatever extent necessary to prevent damage to them by correspondingly narrowing the gaps between the valve seat, the screw head and the retaining ring end wall. Moreover, as the plug is lifted off the valve seat, an expansion chamber is formed between the two pressure drop zones into which gas which passed the first pressure drop zone flows. In this expansion chamber the gas expands which further reduces its pressure and speed.

The full pressure differential and maximum fluid flow rates past the O-ring will not occur until after the O-ring has been completely disengaged from the valve seat and has moved some distance away from it. Thus, the pressure drop zones established by the present invention prevent damage to the O-ring and, to a lesser extent, to the much less vulnerable hard sealing disk 40. This is true irrespective of whether the excess pressure is applied to valve inlet 6 or to outlet 8. Thus, the valve of the present invention is truly an omnidirectional valve.

The effectiveness of the pressure drop zones. dimensioned as above set forth, is demonstrated by the fact that if a pressure differential of 2000 psi exists between the inlet and the outlet, and with plug 38 in its closed position, the pressure at the sealing disk or the O-ring (depending on where the high pressure is applied) is only in the range of between about 100 psi to about 300 psi. In other words, there is 85–95% increase in pressure drop across the narrow gap between the valve seat, screw head 44 or retaining ring end wall 50 when the height of screw head and the thickness of the retaining ring end wall are about 0.050 inch.

Moreover, once the seal has been broken, the pressure drop zones remain effective until the plug has been raised by about the height of the screw head. Consequently, even though the seal has been broken, fluid, i.e., gas must flow past two pressure drop zones which greatly reduces the flow rate. Thus, with the earlier mentioned pressure differential of 2000 psi, which normally generate gas flow rates as high as 0.098 cu. ft./sec., the actual flow rate past the O-ring (and sealing disk 40) is only a fraction thereof and typically is in the range of between about 0.005–0.015 cu. ft./sec from the time the seal is broken until the pressure drop zones become inactive.

Conversely, during closure of the valve while either the inlet or the outlet is subjected to a high fluid pressure, the pressure drop zones 49, 51 established by the present invention will protect the sealing disk and, especially, the O-ring 48 against damage. When the plug 38 is lowered, the retaining ring end wall 50 and screw head 44 will overlap the outer and inner, respectively, surfaces of valve seat 26 before the O-ring contacts the seat. Once the pressure drop zones become effective, the fluid flow rate is immediately reduced. Consequently, the sealing disk 40, and especially the O-ring 48 are not subjected to high fluid flow rates or pressures when they come in contact with the seat. Accordingly, there is neither a high flow rate nor a high pressure differential which would dislodge or extrude the O-ring from its gland which, if permitted to occur, may pull the O-ring from the gland or cause it to partially protrude therefrom and then be sheared off as it engages the valve seat. As during the opening of the valve, damage to the O-ring is prevented because the pressure drop zones are established before the O-ring and the sealing disk 40 contact the valve seat. During closing, it is this initial contact which typically causes damage to the seal ring unless it is firmly grasped and held in place.

Hence, it is an important aspect of the present invention to form the pressure drop zones so that during opening they remain in effect until after the O-ring has become completely disengaged from the valve seat and, during closing, they become effective before the O-ring contacts the seat.

Figure 2:
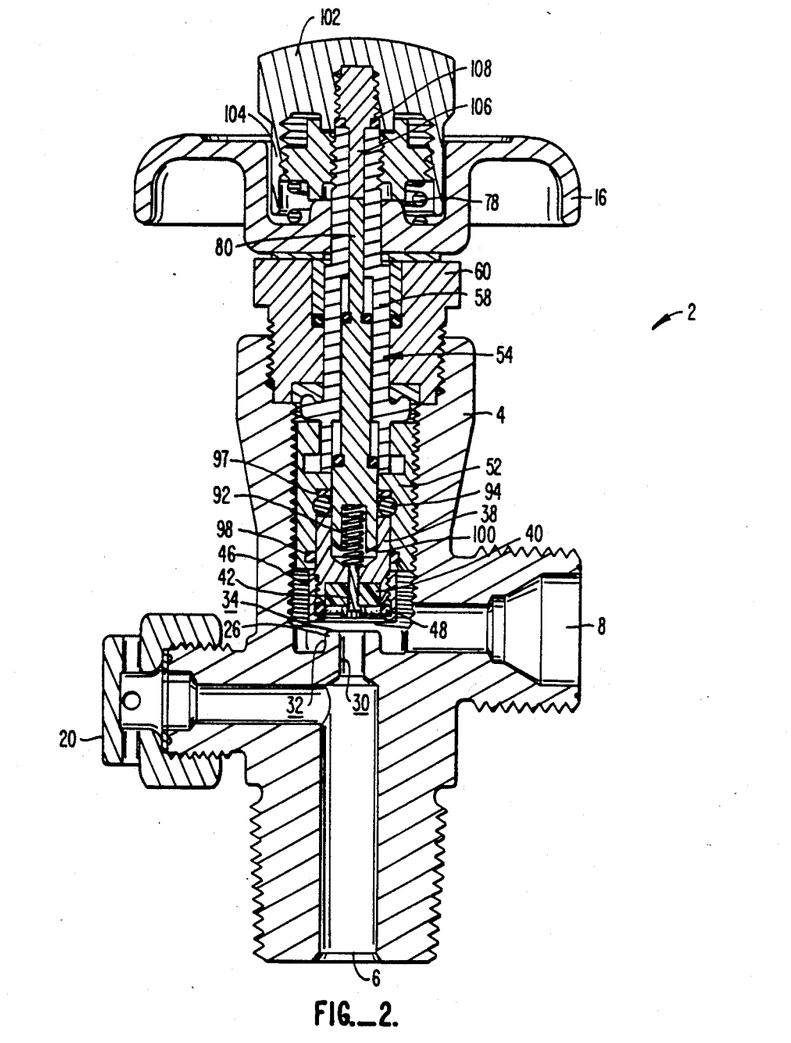
FIG. 2 is an elevational view, in section, similar to FIG. 1 and shows the valve when the opening key is in use.
Figure 3:
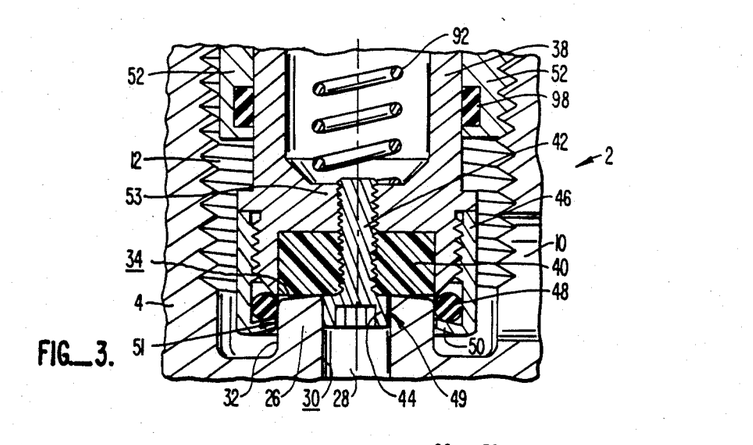
FIG. 3 is a fragmentary, detailed view, in section, of a valve plug and valve seat in the fully closed position.
Figure 4:
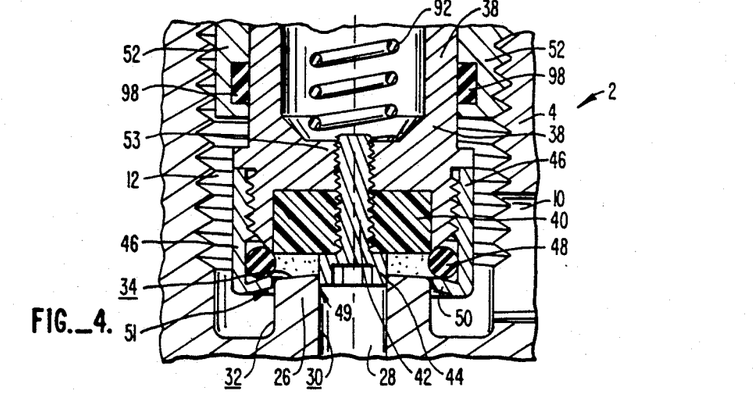
FIG. 4 is a fragmentary, detailed view, in section, of the valve plug and valve seat shown in FIG. 3 in a partially open position.
Figure 5:
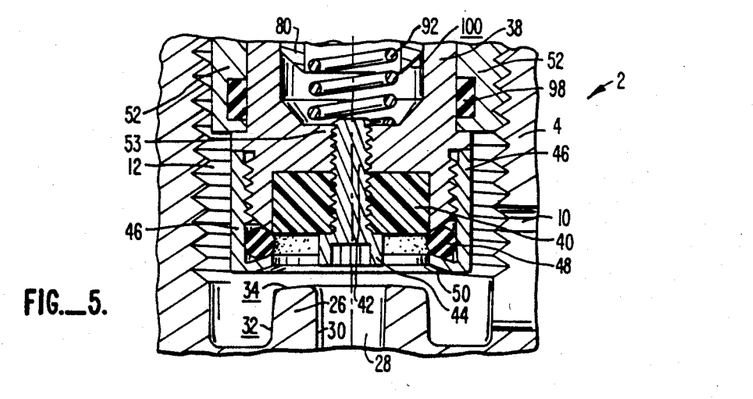
FIG. 5 is a fragmentary, detailed view, in section, of the valve plug and valve seat shown in FIG. 3 in the fully open position.

Referring now to FIGS. 1 and 2, the actuating mechanism 54 for moving plug 38 towards and away from valve seat 26, i.e., between its open and closed positions, comprises the already mentioned lower stem or sleeve 52 which is threaded into housing chamber 12. By rotating the sleeve it can be moved axially within the chamber towards and away from valve seat 26. The end of the sleeve facing access opening 14 has a square hole 56 and an upper stem 58, rotatably mounted in a packing nut 60 secured into the threaded bore of the housing at the access opening, has a square stub shaft 62 which extends into the square hole. The remainder of the upper stem extends upwardly past packing nut 60 and through an aperture in handwheel 16. In a preferred embodiment, the portion of the upper stem extending through the aperture in the handwheel is square to thereby nonrotatably secure the two to each other so that handwheel rotation results in a like rotation of the upper stem and hence of the lower stem 52. Handwheel nut 64 threadably engages the upper stem and secures it to the handwheel.

The stem is appropriately sealed and packed to prevent leakage while permitting rotation of the stem relative to the housing. In the illustrated embodiment, this is accomplished with a packing ring 66 on the side of packing nut 60 facing housing chamber 12, a journal bearing-follower 68 and an O-ring stem seal 70.

Further, a low friction washer 72 is preferably interposed between the underside of handwheel 16 and packing nut 60 and a handwheel compression spring 78 between the handwheel and handwheel nut 64 urges the handwheel against the washer and radially outwardly extending flanges 74 on the upper stem 58 against the underside of packing ring 66. Thus, the handwheel, and thereby the upper and lower stems 58, 52 are freely rotatable while the handwheel spring takes up any axial play that might otherwise exist between the underside of the handwheel and radial flange 74.

Finally, handwheel 16 defines a well 76 into which the handwheel nut extends. The well is of the larger diameter than the nut to define an annular space therebetween. The nut also includes an external thread which faces the vertical walls of the well for purposes further described below.

The upper stem 58 is hollow over its entire length. A locking pin 80 is axially movably disposed within the hollow interior of the stem and it has a pin section 82, an intermediate section and an enlarged diameter end section 84. The hollow interior of the upper stem is stepped, i.e., its cross-sectional diameter increases in discrete steps from the top of the stem to the lower (innermost) end thereof so as to axially slidably receive the locking pin. The end section of the locking pin includes an axial, open-ended bore 86 which faces towards the inlet of the valve.

A compression check spring 92 is disposed within bore 86 and its ends rest against the bottom of the bore and the transverse bulkhead 53 of plug 38. The check spring urges the plug and locking pin 80 apart, that is it urges the plug towards valve seat 26 and the locking pin upwardly towards access opening 14. Upper and lower locking pin O-rings 88, 90 are thereby urged against shoulders on upper stem 58 to establish a seal and prevent the escape of pressurized gas through the hollow interior of the upper stem. The locking pin is dimensioned so that it is substantially flush with the upper end of stem 58 when check spring 92 urges it upwardly to the maximum extent, i.e., when O-rings 88, 90 abut the corresponding shoulders of the upper stem.

Plug 38 includes a plurality of preferably three or four radial bores adjacent its upper end each of which houses a locking ball 94. The lower stem 52 includes a radially inwardly opening groove 96 which is dimensioned to partially receive the locking balls when the latter are moved radially outwardly. The radial bores and groove 96 are positioned so that they are aligned when the plug extends as far as possible into the lower stem, i.e., when the upper end of the plug abuts against radially inwardly extending shoulder 97 of the lower stem. This relative position of the plug and the lower stem is shown in FIG. 2.

The lower stem further includes a radially inwardly opening groove adjacent its lowermost end which receives a resilient, e.g., elastomeric vibration dampening ring 98. The dampening ring contacts the periphery of plug 38 and prevents it from vibrating in the lower sleeve when the plug is in its open position (shown in FIG. 2) and high velocity gas flows past it.

The end section 84 of locking pin 80 terminates in a tapered or conical end surface 100. It engages locking balls 94 when the locking pin is axially moved from its extended position (shown in FIG. 1) to its inwardly retracted position (shown in FIG. 2) to thereby move the balls radially outwardly until they nest in groove 96 of the lower stem. In this manner, plug 38 can be locked to lower stem 52 so that no relative axial movements between the two can take place although relative rotational movement between them is possible. The cylindrical periphery of locking pin end section 84 keeps the locking pins in their radially extended position. When the locking pin is moved axially in an upward direction until the conical end surface 100 has passed the locking balls, the balls can move radially inwardly out of groove 96 in the lower stem to again permit relative axial movements between the lower stem and the valve plug.

To prevent the locking balls from falling out of the radial bores in the plug, the bores are drilled to a depth equal to 90% of the thickness of the wall in the plug 38 using a standard drill bit.

It should be noted that the locking balls can be moved radially outwardly only when the radial bores in the plug are aligned with groove 96 in the lower stem. When they are offset, it is not possible to move locking pin downwardly past the balls because the balls protrude partially into the plug. This prevents the downward movement of the locking pin past the point where the conical end surface 100 contacts the balls.

Turning now to the functioning of actuating mechanism 54, referring to FIGS. 1 and 2, and assuming the valve to be threaded on to a cylinder (not shown) filled with high pressure gas, the valve is initially closed to prevent any gas flow. This is effected by turning handwheel 16 until lower stem 52 engages the upper end of plug 38 and presses sealing disk 40 with the requisite force against end face 34 of valve seat 26. When gas is to be dispensed, the handwheel is turned in the appropriate direction, thereby rotating upper stem 58. This rotation is transmitted to lower stem 52 via square hole 56 and stub shaft 62. The lower stem is thereby retracted upwardly relative to plug 38. The high pressure prevailing in the cylinder forces plug 38 upwardly by a like amount by maintaining check spring 92 compressed as is illustrated in FIG. 2. Pressurized gas is now free to flow from inlet 6 through passage 10 to outlet 8. The restricted portion 28 of the passage is dimensioned so that represents the maximum flow restriction between the two ports when the plug is fully opened.

Should the pressure in the gas cylinder drop below the threshold level, at which the upwardly directed force generated by the pressurized gas and acting on the plug is less than the force generated by check spring 92, the latter forces the plug against the gas pressure downwardly onto valve seat 26. Although the spring force is relatively small and typically insufficient to form a seal between end face 34 and hard sealing disk 40, the relatively soft O-ring 48 establishes a positive seal with the cylindrical convex seating surface 32 (see FIG. 3) even in the absence of a large sealing force so that there is no gas leakage. Consequently, the cylinder can be stored for indefinite periods of time while the threshold gas pressure is retained in it. As a result, its interior will remain filled with original gas and no contamination takes place so that it can be refilled at any time without having to first purge and/or clean the cylinder.

When it is desired to open the check valve, typically for recharging the cylinder with high pressure gas, the valve is first closed as above-described by turning handwheel 16. When the valve is fully closed, further rotation of the handwheel is not possible because lower stem 52 engages the upper end of plug 38 and presses sealing disk 40 rests against end face 34 of valve seat 26.

Next, an opening key 102 is inserted into the hollow interior of upper stem 58 to push locking pin 80 downwardly until its conical end face 100 has moved past locking balls 94 and pushed them radially outwardly to nest them in annular groove 96 of the lower stem. This is possible because the valve was previously closed and, as described earlier, when plug 38 is in this relative position, the radial openings in it which hold the locking balls are aligned with the annular groove in the lower stem. The relative positions of the plug, the lower stem and the locking pin in this depressed or locking position are illustrated in FIG. 2.

The valve can now be opened as above-described by turning handwheel 16 in the opposite direction. The valve will open even if the pressure in the cylinder is below the threshold level and, normally, check spring 92 would urge the plug into its closed position because the nesting of the locking balls in the annular groove of the lower stem prevents relative axial movements between the lower stem and the plug and, thereby, effectively deactivates check spring 92.

Gas can now flow freely between the inlet and the outlet. If the outlet is open, gas trapped in the cylinder will flow out of it until the pressure in the cylinder equals the pressure at the outlet. Conversely, the cylinder can be charged with high pressure gas by connecting an appropriate pressurized gas source (not shown) to the threaded end of the outlet port 8. Once the cylinder is fully charged, the valve is again closed by turning handwheel 16 until hard sealing disk 40 is pressed with the appropriate sealing force against valve seat 26. Opening key 102 is removed and the valve is again ready for normal use as above-described.

The locking pin can not be depressed in any convenient manner to permit the opening of the valve when the pressure in the cylinder is at or below the threshold level unless the opening key 102 is properly installed. The unauthorized attempt to depress the locking pin 80 while the value outlet 8 is under high pressure is not possible because the pressure in the valve interior chamber 12 will prevent the installation of the valve opening key 102. To prevent such unauthorized opening or tampering with the valve, the opening key is preferably constructed in the form of a knob which includes a skirt 104 formed so that it can extend into handwheel well 76 by threading it onto the exterior of handwheel nut 64. The opening key further includes a concentric key shaft 106 which is formed so that it can extend into the hollow interior of upper stem 58 forming a seal between "O" ring 108 and the top surface of the upper stem 58 and move locking pin 80 downwardly until end section 84 thereof pushes locking balls 94 radially outwardly (when lower stem 52 and plug 38 are in the appropriate relative positions) to thereby lock the plug to the lower stem. The internal thread on skirt 104 and the key shaft 106 are dimensioned so that the former can engage the thread on handwheel nut 64 only after the key shaft has entered the hollow interior of upper stem 52 a distance sufficient to push locking balls 94 radially outwardly into groove 96. This is only possible, however, if the valve was previously fully closed because only then will the locking balls be in radial alignment with the groove. When the actuating mechanism is in its partially or fully open position, the locking balls are axially spaced from groove 96 in lower stem 52 (as illustrated in FIG. 1). Therefore, the key shaft 106 cannot be inserted far enough into the hollow interior of the upper stem to thread the opening key on to the handwheel nut. Thus, the opening key can be threaded onto the handwheel nut 64 only after the valve (and the actuating mechanism) are fully closed.

This is an important feature of the present invention which prevents damage to the internal components of the valve and assures that check plug 38 is coupled to lower stem 52 only when the valve is in the closed position. The recessed nature of the interengaging threads on the handwheel nut and the opening key make it virtually impossible for unauthorized person to tamper with the operating mechanism because a person not familiar with the interior working of the valve is highly unlikely to be able to override the check mechanism unless he has the opening key. The subtle design of the opening key 102 makes it highly unlikely that the user can duplicate it which is a safety feature of the valve system. Typically, the opening key will not be available to users of the gas cylinder. Instead, it is retained and used only by those who are authorized to recharge the cylinder with high pressure gas.

Figure 6:
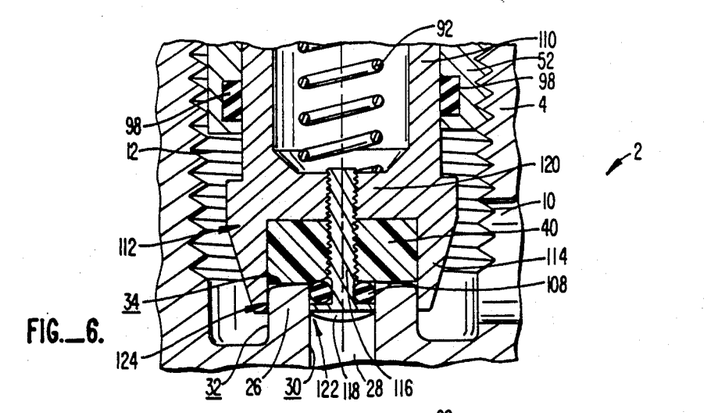
FIG. 6 is a fragmentary detailed view, in section of another embodiment of the present invention and shows the valve plug and valve seat in the fully closed position.
Figure 7:
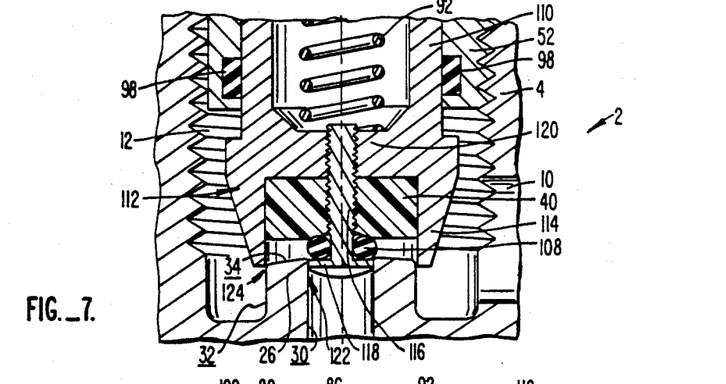
FIG. 7 is a fragmentary, detailed view, in section, of the embodiment shown in FIG. 6 with the valve plug in a partially open position.
Figure 8:
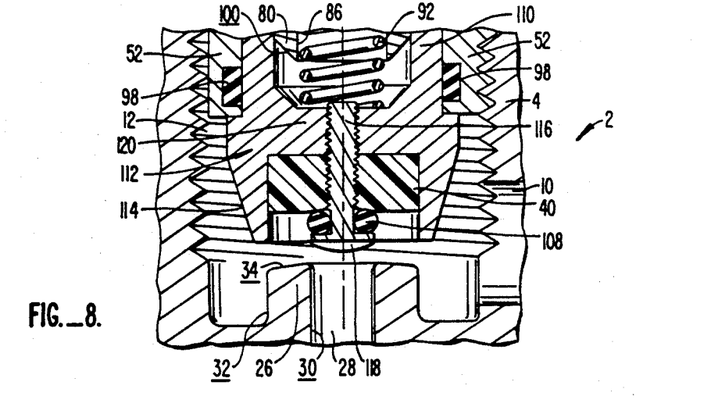
FIG. 8 is a fragmentary, detailed view, in section, of the embodiment shown in FIG. 6 with the valve plug in the fully open position.

Referring now briefly to FIGS. 6–8, in an alternative embodiment of the present invention valve 2 is constructed as above-described except for the mounting and location of the soft seal ring. In this embodiment, a plug 110, otherwise constructed like plug 38 described above, has a lower end 112 defined by cylindrical skirt 114 that forces a recess into which hard sealing disk 40 fits. Screw 116 has a head 118 with a cylindrical periphery and mounts a soft O-ring 108 which sealingly engages the interior, concave sealing surface 30 of valve seat 26. Screw 116 is threaded into a transverse bulkhead 120 of the plug and retains both the O-ring and sealing disk in place.

The cylindrical skirt 114 is dimensioned so that it extends over the outer, convex surface 32 of the valve seat with the earlier described small gap to establish a pressure drop zone 124. Similarly, the cylindrical periphery of screw head 118 is dimensioned to define a narrow gap between it and the surrounding inner surface 30 to form the other pressure drop zone 122. Both pressure drop zones are dimensioned so that they remain effective until after disk 40 has lifted off valve seat end face 34 and O-ring 108 has cleared sealing surface 30 during the opening of the valve, and before the O-ring engages the sealing surface during the closing of the valve for the purpose and to obtain the benefits discussed above. The remainder of the valve is identical with the embodiment illustrated in FIGS. 1 and 2 and described earlier. For clarity, FIGS. 6–8 show the same relevant reference numerals as are shown in FIGS. 1–5.

I claim:

1. A shut-off valve for use with high pressure gas cylinders adapted to retain a residual pressure in the cylinder, the valve comprising:

a housing having an inlet port, an outlet port, a passage therebetween, and means defining a valve seat disposed intermediate the ports;

a plug movable in the housing between open and closed positions and having a relatively soft surface for sealing against the seat when the plug is in its closed position to prevent relatively low pressure fluid from flowing through the passage and a relatively hard surface for sealing against the seat to prevent relatively high pressure fluid from flowing through the passage;

and pressure drop means disposed in the passage and defining first and second high pressure drop zones in the flow direction on opposite sides of the soft surface and between the soft surface and each of the ports so that the pressure at the soft surface is substantially less than in an adjoining portion of the passage holding a high pressure fluid when the plug is in its closed position, the pressure drop means being adapted to retain the drop zones for a predetermined distance of movement of the plug from and into its closed position and to eliminate the pressure drop zone to permit a full flow of fluid through the passage when the plug is beyond said distance;

whereby the formation of a large pressure differential across the soft surface and a high fluid flow velocity towards either of the ports are prevented by the first and second pressure drop means while the soft surface is proximate the seat so that the soft surface sustains no damage when the valve is closed or opened and high pressure fluid is applied to one of the ports.

2. A shut-off valve according to claim 1 including means cooperatively defined by the plug and the seat, forming an expansion space communicating with the soft surface, and disposed between the first and second pressure drop zones so that the velocity of fluid flowing through one of the pressure drop zones is substantially reduced upon entering the space.

3. A shut-off valve according to claim 2 wherein the first pressure drop zone is defined by an annular passage.

4. A shut-off valve according to claim 3 wherein the second pressure drop zone is defined by an annular passage.

5. A shut-off valve according to claim 3 wherein the annular passage has a radial depth in the range of between about 0.001 to about 0.015 inch.

6. A shut-off valve according to claim 4 wherein the soft surface is defined by an elastomeric O-ring and the valve seat includes a cylindrical seating surface adapted to sealingly engage the O-ring.

7. A shut-off valve according to claim 6 wherein the hard surface is oriented generally transversely to the cylindrical seating surface, and wherein the valve seat includes a surface shaped complementary to the hard surface and oriented generally transversely to the cylindrical surface.

8. A shut-off valve according to claim 1 wherein the hard surface is substantially perpendicular to and fully surrounds the passage.

9. A shut-off valve according to claim 8 wherein the hard surface is defined by a member constructed of a relatively hard material, including means for securing the member to the plug, and wherein the second pressure drop zone is in part defined by the means securing the member to the plug.

10. A shut-off valve according to claim 9 wherein the means securing the member to the plug comprises an elongated portion engaging the plug and a head securing the member to the plug and defining the part of the second pressure drop zone.

11. A shut-off valve according to claim 10 wherein the elongated portion comprises a screw and the head comprises a screw head.

12. A shut-off valve for use with high pressure gas cylinders adapted to retain a residual gas pressure in the cylinder, the valve comprising:
a tubular housing having an axially oriented axial port, an access opening at an end of the housing opposite the axial port, and a generally radially oriented radial port, a passage having a portion extending in an axial direction between the ports, an annular hard valve seat circumscribing the passage and located at the portion, and a cylindrical soft valve seat surrounding the passage and located at the portion and in the vicinity of the hard seat;
a plug disposed in the housing between the hard seat and the access opening and axially movable between closed and open positions towards and away from the hard seat, a relatively hard sealing member attached to an end of the plug and adapted to sealingly engage the hard seat when the plug is in its closed position, means securing the hard sealing member to the plug, and an annular soft sealing ring secured to the plug and arranged to be in engagement with the soft seat when the hard member engages the hard seat;
actuator means protruding through the access opening for axially moving the plug between its closed and open positions;
first pressure drop means located proximate to the passage portion and between the soft sealing ring and the radial port and second pressure drop means located proximate to the passage portion and between the soft sealing ring and the axial port, the pressure drop means being arranged to define a reduced flow path for pressurized fluid applied to either port of a cross section and shape to generate a pressure drop sufficient to prevent damage to the soft ring when the plug is moved towards or away from its closed position, to terminate or permit, respectively, the flow of pressurized fluid from either port to the other, the pressure drop means being further constructed to remain effective for as long as the plug is within a predetermined distance from its closed position and to permit a full, pressurized fluid flow between the ports when the plug has moved beyond the predetermined distance from its closed position.

13. A shut-off valve according to claim 12 wherein the soft sealing ring comprises an elastomeric O-ring and the hard sealing member comprises a generally planar, relatively inelastic sealing disc and wherein the means for securing the disk to the plug includes means defining a generally cylindrical head extending from the hard sealing surface past the hard seat into the passage leading to the axial port.

14. A shut-off valve according to claim 13 wherein the second pressure drop means comprises a convex, substantially cylindrical surface defined by the head.

15. A shut-off valve according to claim 14 wherein the head includes means for holding the O-ring, and wherein the soft seat is defined by a concave cylindrical surface of the passage adjacent the hard seat and extending towards the axial port.

16. A shut-off valve according to claim 13 wherein the plug includes an annular skirt extending axially from the hard sealing member towards and past the hard seat, and the housing includes an annular protrusion defining the hard seat, surrounding the portion of the passage, and forming a convex, cylindrical surface, and wherein the convex cylindrical surface comprises part of the first pressure drop means.

17. A shut-off valve means according to claim 16 wherein the O-ring is carried by the skirt and engages the convex cylindrical surface when the plug is in its closed position.

18. A shut-off valve according to claim 17 wherein the skirt has a free end generally facing in the direction of the axial port, and wherein a segment of the skirt between the O-ring and the free end of the skirt comprises part of the first pressure drop means.

19. A shut-off valve according to claim 12 wherein the plug is axially movable relative to the actuator means, wherein the actuator means and the plug include opposing surfaces arranged generally transversely to the axial portion of the passage adapted to engage each other for moving the plug with the actuator means into its closed position, and spring means disposed between the plug and the actuator means for resiliently urging the plug into its closed position, the spring means being selected to sealingly engage the soft sealing ring with the soft seat until the pressure at the axial port exceeds the pressure at the radial port by a predetermined amount, whereby pressure at the axial port in excess of the predetermined amount causes movement of the plug against the force exerted by the spring means toward its open position to permit a fluid flow between the ports.

20. A shut-off valve according to claim 19 including means for selectively locking the plug to the actuator means when the plug is in its closed position to deactivate the spring means so that the plug can be moved into its opened position with the actuator means even when the relative pressure at the axial port is below the predetermined amount.

21. A shut-off valve for use with high pressure gas cylinders adapted to retain a residual gas pressure in the cylinder, the valve comprising:
an elongated, tubular housing having a first open end defining an axial port and a second open end defining an axially oriented access opening in general axial alignment with the port, the housing further defining a generally radially oriented port in fluid communication with the axial port via a passage formed by an axial portion communicating with the axial port, a radial portion communicating with the radial port, and an intermediate chamber fluidly connecting the portions, the axial portion terminating in a raised boss defining an axially facing first valve seat and generally concentric inner and outer, concave and convex, respectively, cylindrical surfaces, one of which forms a second valve seat;
a valve plug disposed in the chamber and axially movable between a closed position in which it is proximate the boss and an open position in which it is remote from the boss, the plug including a relatively hard sealing disk adapted to sealingly engage the first valve seat for forming a high pressure seal, screw means for securing the disk to the plug including a head extending from the disk into the axial portion of the passage, a skirt surrounding the disk and extending in an axial direction over a portion of the convex cylindrical surface in close radial proximity thereto when the plug is in its closed position, and a relatively soft seal ring, disposed in the direction of fluid flow between the ports intermediate the head and a free end of the skirt and adapted to sealingly engage the second valve seat for forming a low pressure seal;
the head and a portion of the skirt adjoining a free end thereof forming with the respective cylindrical surfaces high pressure drop zones adapted to reduce the pressure acting on and the speed of gas flowing past the seal ring sufficiently to prevent relative movement of and damage to the seal ring when the plug is moved into or out of its closed position and a relatively high pressure is applied to one of the ports while the other port is at a substantially lower pressure;
an actuating stem including an axially movable segment extending from the exterior of the housing through the access opening into engagement with an end of the plug facing towards the access opening so that axial movement of the stem segment towards the axial port moves the disk and seal ring into sealing engagement with the corresponding valve seats of the housing, and spring means for resiliently urging the plug into its closed position, the spring means being constructed so that a positive pressure differential between the axial port and the radial port in excess of the residual pressure moves the plug in opposition to the spring means towards its open position; and
selective coupling means between the segment of the stem and the plug and operable from an exterior of the housing through the access opening for selectively coupling the plug, when it is in its closed position, with the segment so that operation of the actuating stem moves the plug from its closed position to its open position even when there is a positive pressure differential between the radial port and the axial port.

22. A valve according to claim 21 wherein the seal ring engages the convex, cylindrical surface of the lip.

23. A shut-off valve according to claim 21 wherein the seal ring is disposed between the head and the hard disk and engages the convex cylindrical surface of the lip.

24. A shut-off valve according to claim 21 wherein the pressure drop means define annular gaps between the skirt and the convex cylindrical surface, and between the head and the concave cylindrical surface of a thickness in the range of between about 0.001 to about 0.015 inch.

25. A shut-off valve according to claim 24 wherein the depth of the annular gaps is in the range of between about 0.001 and 0.010 inch.

26. A shut-off valve according to claim 20 wherein the stem segment comprises a sleeve wholly disposed inside and threadably engaging the housing so that relative rotation of the sleeve in the housing causes it to move in an axial direction, and wherein the actuating stem includes a portion rotatably mounted to the housing, having an inner end non-rotatably connected with the sleeve, and an outer end disposed exteriorly of the housing for imparting rotation to the stem, the sleeve and the portion being movable relative to each other in an axial direction.

27. A shut-off valve according to claim 26 wherein the coupling means comprises a locking pin axially movably disposed within the actuating stem, accessible from an exterior of the housing and extending into the sleeve, and means engageable by an end of the pin when the sleeve is in a position corresponding to the closed position of the plug for axially immovably connecting the plug to the sleeve so that, once coupled, rotation of the stem portion and the sleeve and a resulting axial movement of the sleeve imparts the same axial movement to the plug.

28. A shut-off valve according to claim 27 including means preventing the engagement of the connecting means when the sleeve is in an axial position other than the one which corresponds to the closed position of the plug.

29. A shut-off valve according to claim 28 wherein the spring means engages the plug and the pin and resiliently urges the pin towards the access opening.

30. A shut-off valve according to claim 29 including key means engageable with the pin from the exterior of the housing for axially moving the pin against the force of the spring means towards the plug to engage the connecting means when the sleeve is in the position corresponding to the closed position of the plug.

31. A valve according to claim 30 wherein the actuating stem, on the exterior of the housing, and the key means include cooperating threads, and wherein the threads on the actuating stem and the key means are arranged and positioned to prevent their engagement until after the key means has moved the pin in an axial direction towards the plug a distance sufficient to engage the connecting means, whereby the actuating stem can move the plug from its closed to its opened position only after the sleeve has first been moved into the position corresponding to the closed position of the plug.

32. A shut-off valve for use with high pressure gas cylinders adapted to retain a residual gas pressure in the cylinder, the valve comprising:
an elongated, tubular housing having a first open end defining an axial port and a second open end defining an axially oriented access opening in general axial alignment with the port, the housing further defining a generally radially oriented port in fluid communication with the axial port via a passage formed by an axial portion communicating with the axial port, a radial portion communicating with the radial port, and an intermediate chamber fluidly connecting the portions, the axial portion terminating in a valve seat defining first and second seating surfaces;

a valve plug disposed in the chamber and axially moveable between a closed position in which it is proximate the valve seat and an open position in which it is remote from the seat, the plug including a relatively hard first sealing member adapted to sealingly engage the first seating surface, for forming a high pressure seal, and a relatively soft second sealing member adapted to sealingly engage the second seating surface for forming a low pressure seal;

pressure drop means disposed in the passage defining first and second high pressure drop zones located in the flow direction on opposite sides of the soft second sealing member and between the soft second sealing member and each of the ports so that the pressure at the soft second sealing member is substantially less than in an adjoining portion of the passage holding a high pressure fluid when the plug is in its closed position, the pressure drop means being adapted to retain the drop zones for a predetermined distance of movement of the plug from and into its closed position and to eliminate the pressure drop zone to permit a full flow of fluid through the passage when the plug is beyond said distance;

whereby the formation of a large pressure differential across the soft second sealing member and a high fluid flow velocity towards either of the ports are prevented by the first and second pressure drop means while the soft second sealing member sustains no damage when the valve is closed or opened and high pressure fluid is applied to one of the ports;

a valve actuator including stem having a portion rotatably and axially substantially immovably mounted to the housing and an axially movable, rotatable segment threadably engaging an interior of the housing so that rotation of the portion results in an axial movement of the segment, the stem extending from the exterior of the housing through the access opening into engagement with an end of the plug facing towards the access opening so that axial movement of the stem segment towards the valve seat moves the sealing members into sealing engagement with the corresponding seating surfaces, the segment and the plug being further constructed so that the plug can move axially relative to the segment when the segment is relatively remote from the valve seat, and spring means for resiliently urging the plug into its closed position, the spring means being constructed so that a positive pressure differential between the axial port and the radial port in excess of the residual pressure moves the plug in opposition to the spring means towards its open position, and selective coupling means between the segment of the stem and the plug and operable from an exterior of the housing through the access opening for selectively coupling the plug, when it is in its closed position, with the segment so that operation of the actuator moves the plug from its closed position to its open position even when the pressure at the radial port exceeds the pressure at the axial port.

33. A shut-off valve according to claim 32 wherein the stem portion includes an inner end non-rotatably connected with the segment, and an outer end disposed exteriorly of the housing for imparting rotation to the stem, the segment and the portion being movable relative to each other in an axial direction.

34. A shut-off valve according to claim 33 wherein the stem has a hollow interior, and Wherein the coupling means comprises a locking pin axially movably disposed in the hollow interior of the stem, accessible from an exterior of the housing and extending into the segment, and means engageable by an end of the pin when the segment is in a position corresponding to the closed position of the plug for axially immovably connecting the plug to the segment so that, once connected, rotation of the stem portion and a resulting axial moVement of the segment imparts the same axial movement to the plug.

35. A shut-off valve according to claim 34 including means preventing the engagement of the connecting means when the segment is in an axial position other than the one which corresponds to the closed position of the plug.

36. A shut-off valve according to claim 35 wherein the spring means engages the plug and the pin and resiliently urges the pin towards the access opening.

37. A shut-off valve according to claim 36 including key means engageable with the pin from the exterior of the housing for axially moving the pin against the force of the spring means towards the plug to engage the connecting means when the segment is in the position corresponding to the closed position of the plug.

38. A valve according to claim 37 wherein the actuator, on the exterior of the housing, and the key means include cooperating threads, and wherein the threads on the actuator and the key means are arranged and positioned to prevent their engagement until after the key means has moved the pin in an axial direction towards the plug a distance sufficient to engage the connecting means, whereby the actuator can move the plug from its closed to its open position only after the segment has first been moved into the position corresponding to the closed position of the plug.

* * * * *